Jan. 31, 1961

R. A. HELMER 2,970,028

GRAPH DEVICE

Filed May 23, 1957

Richard A. Helmer
INVENTOR.

BY *Clarence A. O'Brien*
*and Harvey B. Jacobson*
Attorneys

Jan. 31, 1961 R. A. HELMER 2,970,028
GRAPH DEVICE
Filed May 23, 1957 3 Sheets-Sheet 2

Richard A. Helmer
INVENTOR.

BY *Clarence A. O'Brien*
*and Harvey B. Jacobson*
Attorneys

Jan. 31, 1961
R. A. HELMER
2,970,028
GRAPH DEVICE
Filed May 23, 1957
3 Sheets-Sheet 3
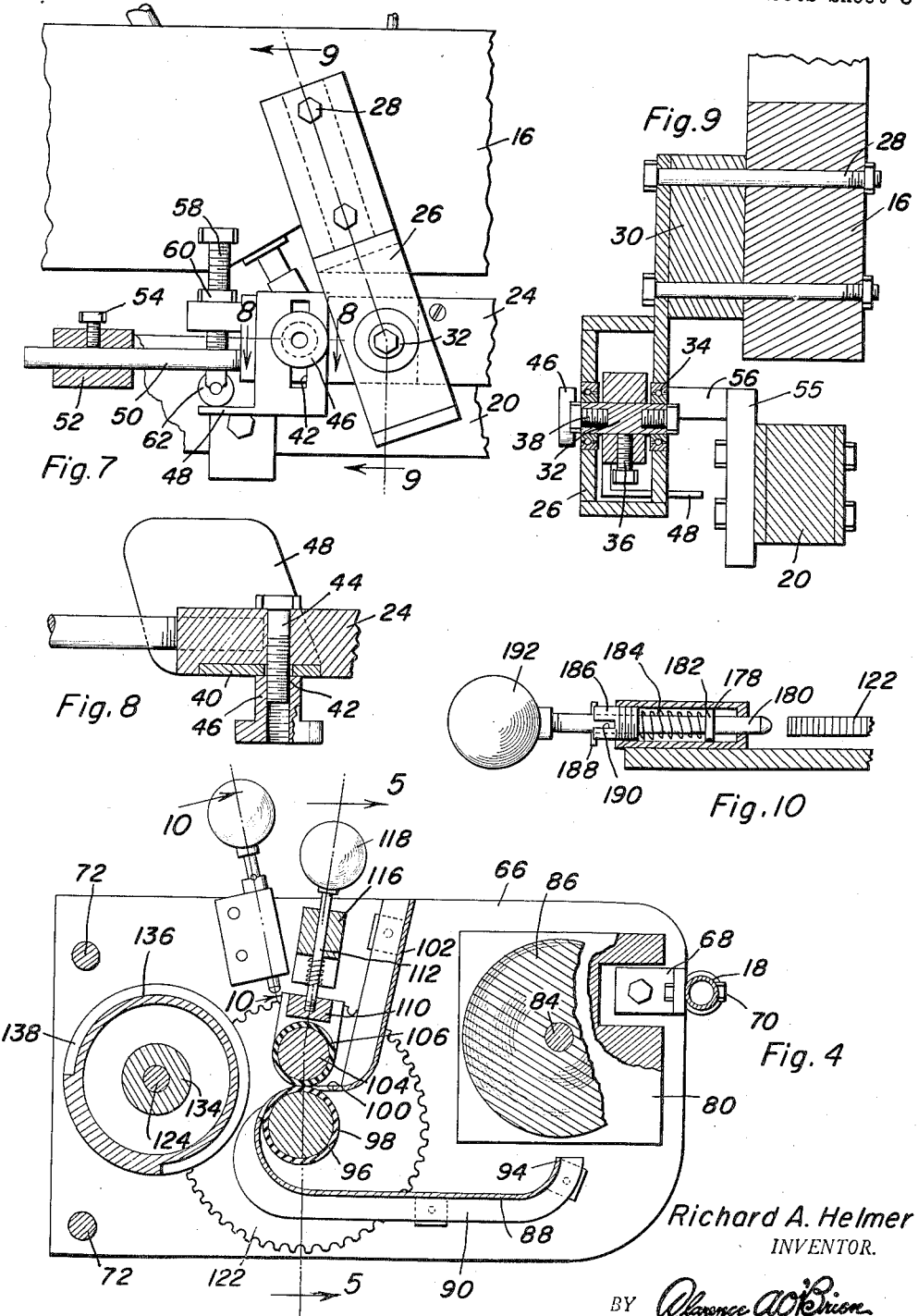
Richard A. Helmer
INVENTOR.

ized Gtates Patent Office 2,970,028
Patented Jan. 31, 1961

2,970,028

GRAPH DEVICE

Richard A. Helmer, Oklahoma City, Okla., assignor to Oklahoma State Highway Department, an agency of Oklahoma Filed May 23, 1957, Ser. No. 661,177

4 Claims. (Cl. 346—25)

The present invention generally relates to an attachment in the form of a mechanical device for graphically recording the movement of the point on a pavement under the contact point of a Benkelman beam as a load carrying vehicle tire approaches and passes over the point.

A Benkelman beam is a conventional structure employed by highway departments to determine movement of the pavement as a loaded vehicle passes over a given point. This structure has a visual indicator requiring the continuous attention of an operator for recording the various readings on the indicator. Accordingly, it is the primary object of the present invention to provide a mechanical attachment for graphically recording the movement of the Benkelman beam and generally consists of a counter-balanced auxiliary beam attached to the stationary frame of the Benkelman beam and being actuated by the probe of the Benkelman beam with the vertical movement being magnified and recorded by a writing instrument at the long end of the auxiliary beam upon a paper graph which is actuated in response to movement of the truck past the reference point.

A further object of the present invention is to provide a graph device in the form of an attachment for an existing structure for recording movement of a point in the pavement as a load passes thereover.

Other objects of the present invention will reside in its simplicity of construction, ease of assembly, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a longitudinal, plan sectional view taken substantially upon a plane passing along section line 4—4 of Figure 2 illustrating the details of construction of the recording device;

Figure 5 is a vertical sectional view taken substantially upon a plane passing along section line 5—5 of Figure 4 illustrating further structural details of the recording device;

Figure 6 is a vertical sectional view taken substantially upon a plane passing along section line 6—6 of Figure 3 illustrating the construction of the drum actuated by a string connected to the moving vehicle;

Figure 7 is an enlarged side elevational view showing the manner of attaching the auxiliary beam to the stationary frame and probe of the Benkelman beam;

Figure 8 is a detailed sectional view taken substantially upon a plane passing along section line 8—8 of Figure 7 illustrating the manner of adjusting the auxiliary beam in relation to the probe of the Benkelman beam;

Figure 9 is a vertical sectional view taken substantially upon a plane passing along section line 9—9 of Figure 7 illustrating further structural details of the attaching means; and Figure 10 is a detailed sectional view taken substantially upon a plane passing along section line 10—10 of Figure 4 illustrating the locking mechanism for the recording device.

Figure 1:
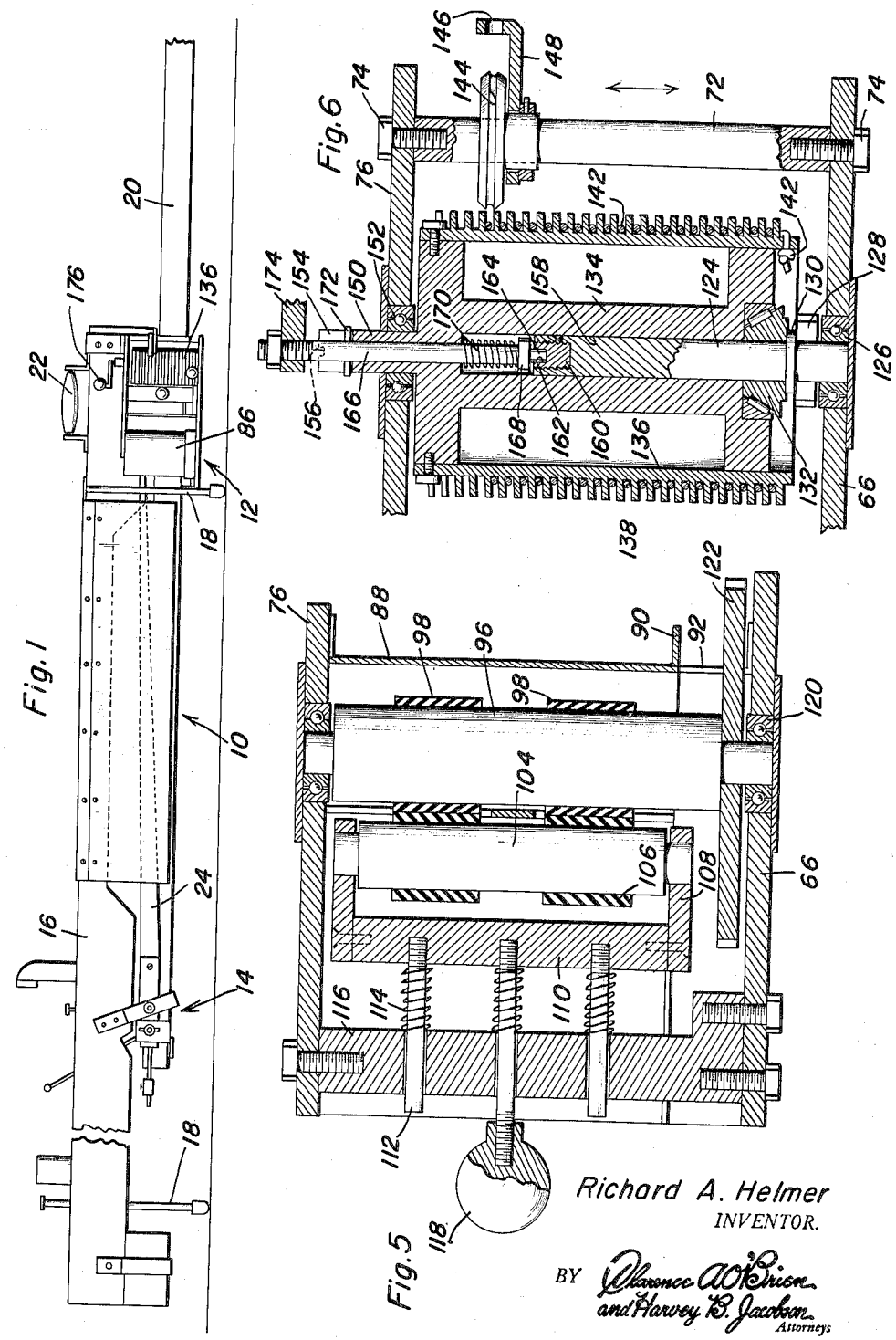
Figure 1 is a side elevational view of the attachment of the present invention secured to a conventional Benkelman beam construction.
Figure 2:
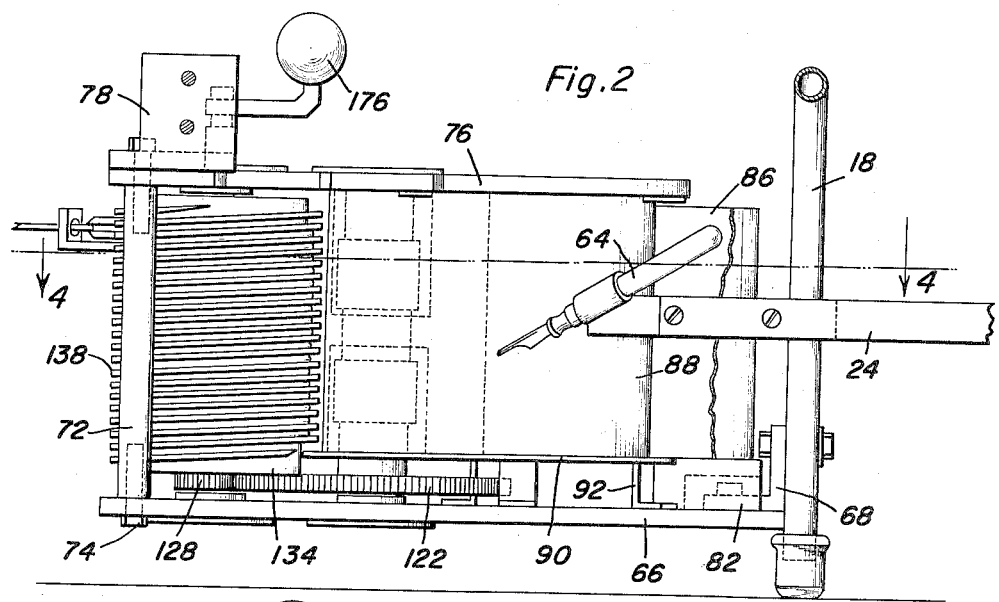
Figure 2 is an enlarged rear elevational view of the graphing device with the Benkelman beam and part of the supporting structure therefor being removed.
Figure 3:
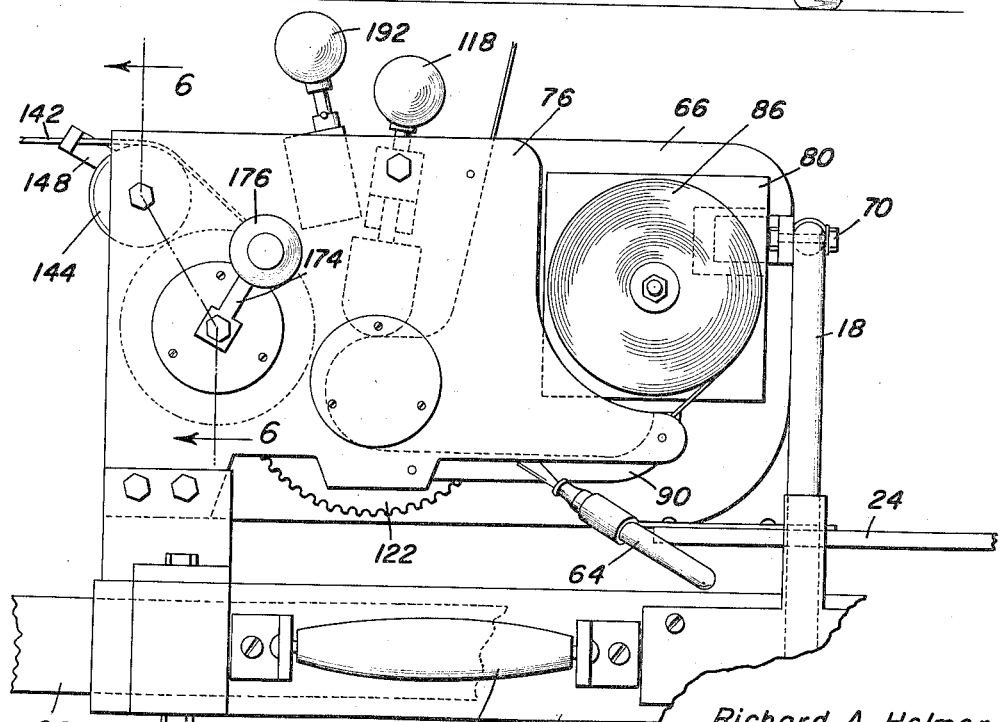
Figure 3 is a fragmentary plan view of the present invention and the manner in which the recording portion of the device is secured to the Benkelman beam stationary frame.

Referring now specifically to the drawings, the numeral 10 generally designates the attachment of the present invention which forms a graph device and includes a recording assembly generally designated by the numeral 12 and a mounting assembly generally designated by the numeral 14. The present invention is adapted to be attached to a Benkelman beam which is a conventional construction and generally includes a stationary frame 16, support legs 18 for supporting the stationary frame from a supporting surface and an elongated probe 20 extending outwardly from the stationary frame 16 and provided with a point or foot on its outer end for engagement with the surface or pavement to be tested so that the probe 20 will transmit movement of the pavement to a suitable indicator such as a dial indicator through mechanism which is not specifically illustrated. For purposes of carrying the implement, a carrying handle 22 is provided.

The graph device 10 includes an auxiliary beam 24 which extends alongside and generally parallel to the probe 20 as shown in Figure 9. A generally open rectangular bracket 26 is provided and extends upwardly alongside the support frame 16 and is connected thereto by fastening bolts 28 which extend through a spacer 30, thus supporting the auxiliary beam 24 from the stationary frame 16 of the Benkelman beam.

The auxiliary beam 24 is supported on an axle 32 extending through the auxiliary beam 24 and journaled in bearings 34 in each side of the open rectangular bracket 26. A setscrew 36 extends through the beam 24 and rigidly clamps the beam 24 to the axle 32 and setscrew 38 are provided in the ends of the axle 32 for preventing longitudinal movement thereof in relation to the bracket 26. The foregoing construction provides a pivotal and highly accurate support for the auxiliary beam 24.

The rear end of the auxiliary beam 24 is provided with a vertically extending bracket 40 having a vertically elongated slot 42 therein for receiving a fastening bolt 44 extending through the auxiliary beam 24 and provided with a knurled screw cap 46 whereby the bracket 40 may be adjusted in relation to the auxiliary beam 24. The lower end of the bracket 40 terminates in an inwardly extending portion 48.

Extending rearwardly from the auxiliary beam 24 is an elongated rod 50 having a counterbalancing weight 52 movably disposed thereon with a setscrew 54 being provided for adjusting the position of the counterbalancing weight 52 thereby counterbalancing the auxiliary beam 24.

The probe 20 of the Benkelman beam is provided with a bracket 55 mounted thereon with an outwardly extending portion 56 generally overlying the inwardly extending portion or plate portion 48 of the bracket 40. Extending through the outwardly extending portion 56 is a screw threaded bolt 58 in screw threaded engagement with a rotatable captive nut 60 and the bolt 58 is provided with a roller 62 on the bottom end thereof whereby the roller 62 engages the inwardly extending portion or plate portion 48 of the bracket 40 for transmitting motion of the probe 20 to the auxiliary beam 24 by virtue of the roller 62 engaging the plate portion 48 in spaced relation to the pivot axis 32 whereby the auxiliary beam 24 will be pivoted about the pivot axis 32. The slot 42 along with the cap screw 46 provides initial adjustment for orientating the auxiliary beam 24 in relationship to the probe 20.

The elongated auxiliary beam 24 will magnify the pivotal movement about the pivot axis 32 for providing substantially vertical movement to a writing implement such as a pen 64 disposed at and clamped to the forward end of the auxiliary beam 24.

The recording device 12 which is associated with the front end of the stationary frame 16 and the writing pen 64 includes a bottom plate 66 supported at one end by a bracket 68 fastened to a vertical leg of the supporting frame 18 by a fastening bolt 70. The other end of the bottom plate 66 is supported by a vertical post member 72 to which it is secured by a fastening bolt 74. The upper end of the post 72 is secured to a top plan 76 and an L-shaped bracket 78 having the vertical leg thereof secured to the stationary frame 16 of the Benkelman beam.

Adjacent the rear and outer corner of the bottom plate 66 is provided a supporting plate 80 disposed in spaced relation thereto by bracket members 82. Extending upwardly from the plate 80 is a projecting post 84 having a spool of paper 86 mounted thereon wherein the spool of paper may be unwound from the spool.

A paper guide in the form of a vertical wall 88 is provided between the top wall 76 and is provided with a lower outturned edge 90 supported in spaced relation to the bottom wall 66 by brackets 92. The vertical partition wall 88 is provided with one end portion curved as indicated by numeral 94 for receiving the paper 86 from the spool of paper with the pen 64 being disposed for engaging the outer surface of the paper as it passes along the partition wall 88 thus providing a writing surface for the pen 64. The other end of the partition wall 88 curves inwardly for discharging the paper onto a roller 96 having a rubber external coating 98. The partition wall 88 has an opening 100 for permitting the paper to come into contact with a large portion of the periphery of the roller 96. The outer end portion of the partition wall is designated by numeral 102 and extends to the outer edge of the upper and lower plates 67 and 76 whereby the paper may then be observed, torn off or wound upon a spool for future reference purposes.

Disposed in opposition to the roller 96 is a movable roller 104 also coated with rubber 106 with the roller 104 being journaled in bracket members 108 that are interconnected by a rigid member 110. As noted in Figure 5, the rollers 96 and 104 are disposed in parallel relation with the coatings 98 and 106 being disclosed as in the form of annular sleeves of cylindrical configuration which do not extend for the full length of the rollers. Also as shown in Figure 5, the rigid member 110 is provided with a plurality of outwardly extending studs 112 having compression coil springs 114 disposed thereon with one end of the springs 114 engaging the rigid member 110 and the other end thereof engaging the inner surface of a transverse connecting plate 116 slidably receiving the outer ends of the pins or pegs 112 and rigidly secured to the top and bottom plates 76 and 66 respectively. The center pin 112 is provided with a handle 118 for permitting the roller 104 to be retracted in relation to the roller 96 thus permitting free movement of the paper.

The outer ends of the roller 96 are journaled in ball bearings 120 and an enlarged spur gear 122 is disposed rigid with the roller 96. The rotation of the enlarged spur gear 122 will cause the roller 96 to rotate and will move the paper over the partition wall 88 at a speed determined by the speed of rotation of the gear 122 since the rollers 96 and 104 will frictionally grip and move the paper over the paper guide.

Rotatably mounted in the bottom plate 66 is an upwardly extending shaft 124 having bearing means 126 supporting the same. Rigid with the shaft 124 is a gear 128 which is in meshing engagement with the gear 122. Shaft 124 is provided with a collar 130 above the gear 128 which engages a thrust bearing 132 of the roller type which supports a cylindrical drum 134 thereon with the outer surface of the drum being designated by numeral 136 including a spiral groove 138 therein, with the spiral groove having a plurality of convolutions for receiving and for winding and unwinding thereon a string 140. The string 140 is terminally secured at one end to the drum as designated by numeral 142 with the free end thereof extending over a rotatable guide pulley 144 slidably disposed on a vertical post 72 with the string then extending through an aperture 146 in a bracket 148 and subsequently is connected to the vehicle causing movement of the pavement by means not illustrated.

The upper end of the cylinder 134 is provided with projecting stud 150 journaled in the bearing 152 in the upper plate 76. The upper end of the stud 150 is provided with a relatively deep transverse groove 154 and a relatively shallow transverse groove 156 arranged in perpendicular relation to each other.

The drum 134 is also provided with a vertical bore 158 rotatably receiving the shaft 124 with the upper end of the shaft 124 being provided with an insert 160 having a polygonal socket 162 therein for releasably engaging a projection 164 on an operating shaft 166 extending vertically through the stud 150 and into the upper end of the bore 158. The operating shaft 166 is provided with a collar 168 thereon and a compression coil spring 170 between the collar 168 and the upper end of the bore 158. The operating shaft 166 is also provided with a transverse pin 172 adjacent the upper end thereof for selective engagement with the grooves or notches 154 and 156 respectively. A transverse handle 174 is secured to the upper end of the operating shaft 166 and the handle 174 is provided with an operating knob 176.

Also provided on the lower plate 66 is a bracket 178 having a dog 180 slidably and telescopically disposed therein with the member 180 being in the form of a rod having a collar 182 thereon and a compression coil spring 184 disposed against the collar and against the closure 186 for the hollow bracket 178. The rod is provided with a transverse pin 188 for engagement with either a shallow or a deep notch 190 for permitting the inner end of the rod 180 to engage and prevent rotation of the gear 122. The outer end of the rod 180 is provided with an operating knob 192. Thus when the rod 180 is in engagement with the gear 122, rotation of the rollers 96 and 104 will be precluded. When it is desired to wind the string on the drum without moving the paper, the operating shaft 166 is moved vertically thus disengaging the projection 164 from the socket 162 for permitting the gear 128 to remain stationary during rotation of the drum. With the line wound around the drum and attached to the moving vehicle, the operating shaft 166 will also be disengaged from the drum 134 with the outward movement of the string causing rotation of the drum 134 and the gear 128 thus driving the gear 122 and the rollers 96 and 104 for moving the paper along the paper guide plate or wall 88 thus causing the pin 54 to make a longitudinal mark thereon and any deflections in the probe will be magnified by the auxiliary beam 24 and recorded permanently on the paper. By using the device as shown in Figure 6, the drum may be rotated for winding the string back on the drum and also for winding the paper back along the paper guide if this course of procedure is desired.

Thus, the present invention provides an attachment for the Benkelman beam wherein movement of the probe of the Benkelman beam will be mechanically recorded on graph paper with the vertical deflections being recorded against longitudinal movement thus providing a graph for determining the behavior of the point of contact of the Benkelman beam probe.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vertical deflection beam for recording the vertical deflection of a roadway surface and the longitudinal movement of a load carrying vehicle causing such deflection on a graph, an attachment comprising a counterbalanced auxiliary beam, a supporting frame attached to the vertical deflection beam, bracket means pivotally supporting said auxiliary beam from the frame alongside the deflection beam, means interconnecting the auxiliary beam and the deflection beam for pivoting the auxiliary beam in response to pivotal movement of the deflection beam, a marking implement mounted on said auxiliary beam in longitudinally spaced relation to the bracket means for movement in a vertical plane in response to movement of the deflection beam, a supply of paper, means mounted on said frame supporting the paper and holding it against the marking implement, paper feeding means mounted on said frame and moving the paper in relation to the marking implement, said paper feeding means including a drum, a flexible element wound on said drum and having one end attached thereto, the other end of said flexible member being free for connection with a moving vehicle causing deflection of the roadway for moving the paper proportionate to the movement of the vehicle thereby plotting a graph on the paper, said feeding means including a pair of friction rollers receiving the paper therebetween and means drivingly connecting the drum to the rollers for driving said rollers in response to rotation of the drum, said drive means between the drum and roller including a manually operable clutch means for selectively disconnecting the drum from the rollers for rotation of the drum independently of the rollers.

2. The combination of claim 1 wherein said drum is provided with a spiral groove in the surface thereof, said flexible member being wound in the groove with one end anchored to the drum and the free end adapted to be connected with the deflection causing vehicle, guide means for said flexible member.

3. The combination of claim 2 wherein said interconnecting means between the drum and rollers includes intermeshing gears, one of said rollers being resiliently urged towards the other of said rollers for gripping and pulling the paper therebetween, each of said rollers having friction sleeves thereon of resilient material for gripping engagement with the paper.

4. The combination of claim 3 together with a locking detent for engagement with one of said gears for preventing rotation thereby locking the paper moving rollers.

References Cited in the file of this patent

UNITED STATES PATENTS

| | | |
|---|---|---|
| 561,316 | Hepp | June 2, 1896 |
| 1,028,154 | Trill | June 4, 1912 |
| 1,413,771 | Pampinella | Apr. 25, 1922 |
| 1,508,249 | Potter | Sept. 9, 1924 |
| 2,205,579 | Scott | June 25, 1940 |
| 2,578,803 | Holmberg et al. | Dec. 18, 1951 |